(12) United States Patent
Tanaka et al.

(10) Patent No.: US 7,096,112 B2
(45) Date of Patent: Aug. 22, 2006

(54) CONTROL APPARATUS FOR VEHICLE

(75) Inventors: Yasuhiro Tanaka, Nisshin (JP);
Tsutomu Miyazaki, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/436,274

(22) Filed: May 13, 2003

(65) Prior Publication Data

US 2003/0229440 A1 Dec. 11, 2003

(30) Foreign Application Priority Data

May 14, 2002 (JP) .................................... 2002-138754

(51) Int. Cl.
*G06G 7/70* (2006.01)

(52) U.S. Cl. .................. 701/114; 701/102; 701/110; 701/115

(58) Field of Classification Search .............. 701/110, 701/114, 115, 102
See application file for complete search history.

(56) References Cited

U.S. PATENT DOCUMENTS

| | | | | |
|---|---|---|---|---|
| 5,655,408 A | * | 8/1997 | Sakakiyama et al. ..... | 74/336 R |
| 6,139,468 A | * | 10/2000 | Goates et al. ................. | 477/97 |
| 6,357,423 B1 | * | 3/2002 | Kanno ........................ | 123/497 |
| 6,439,073 B1 | * | 8/2002 | Ohashi et al. ............. | 74/336 R |
| 6,601,474 B1 | * | 8/2003 | Ishimaru et al. ......... | 74/665 GA |
| 6,766,242 B1 | * | 7/2004 | Honda ........................ | 701/110 |

FOREIGN PATENT DOCUMENTS

| | | |
|---|---|---|
| DE | 41 18 558 A1 | 12/1992 |
| DE | 41 18 558 A 1 | 12/1992 |
| DE | 43 02 483 A1 | 8/1994 |
| DE | 43 02 483 A 1 | 8/1994 |
| DE | 199 40 043 A1 | 3/2000 |
| DE | 199 40 043 A 1 | 3/2000 |
| JP | 05-099061 A | 4/1993 |
| JP | 07-077093 A | 3/1995 |
| JP | 09-105349 A | 4/1997 |
| JP | 05-263693 | 10/1999 |
| JP | 11-294252 A | 10/1999 |
| JP | 2000-257500 A | 9/2000 |
| JP | 2000-345899 A | 12/2000 |
| JP | 2001-086639 A | 3/2001 |

OTHER PUBLICATIONS

Journal of Technical Disclosure Publication No. 2000-1910 published by Japan Institute of Invention and Innovation Apr. 3, 2000.
Corresponding Japanese Language Office Action, Application No. 2002-138754, Issued Oct. 16, 2005.
Corresponding English Langauge Office Action, Application No. 2002-138754, Issued Oct. 18, 2005.

* cited by examiner

*Primary Examiner*—Tony M. Argenbright
*Assistant Examiner*—Johnny H. Hoang
(74) *Attorney, Agent, or Firm*—Kenyon & Kenyon LLP

(57) ABSTRACT

An engine mounted to a vehicle includes at least one manipulation member used for control of output of the engine. An electronic control unit controls the manipulation member in accordance with the driving condition of the engine. When it is determined that there is an abnormality in the electronic control unit, the amount of air drawn into the engine is fixed to a predetermined value and the amount of manipulation of the manipulation member is restricted. When the rotational speed of the engine becomes higher than the predetermined speed, the electronic control unit determines that there is an abnormality relating to the manipulation of the manipulation member.

16 Claims, 8 Drawing Sheets

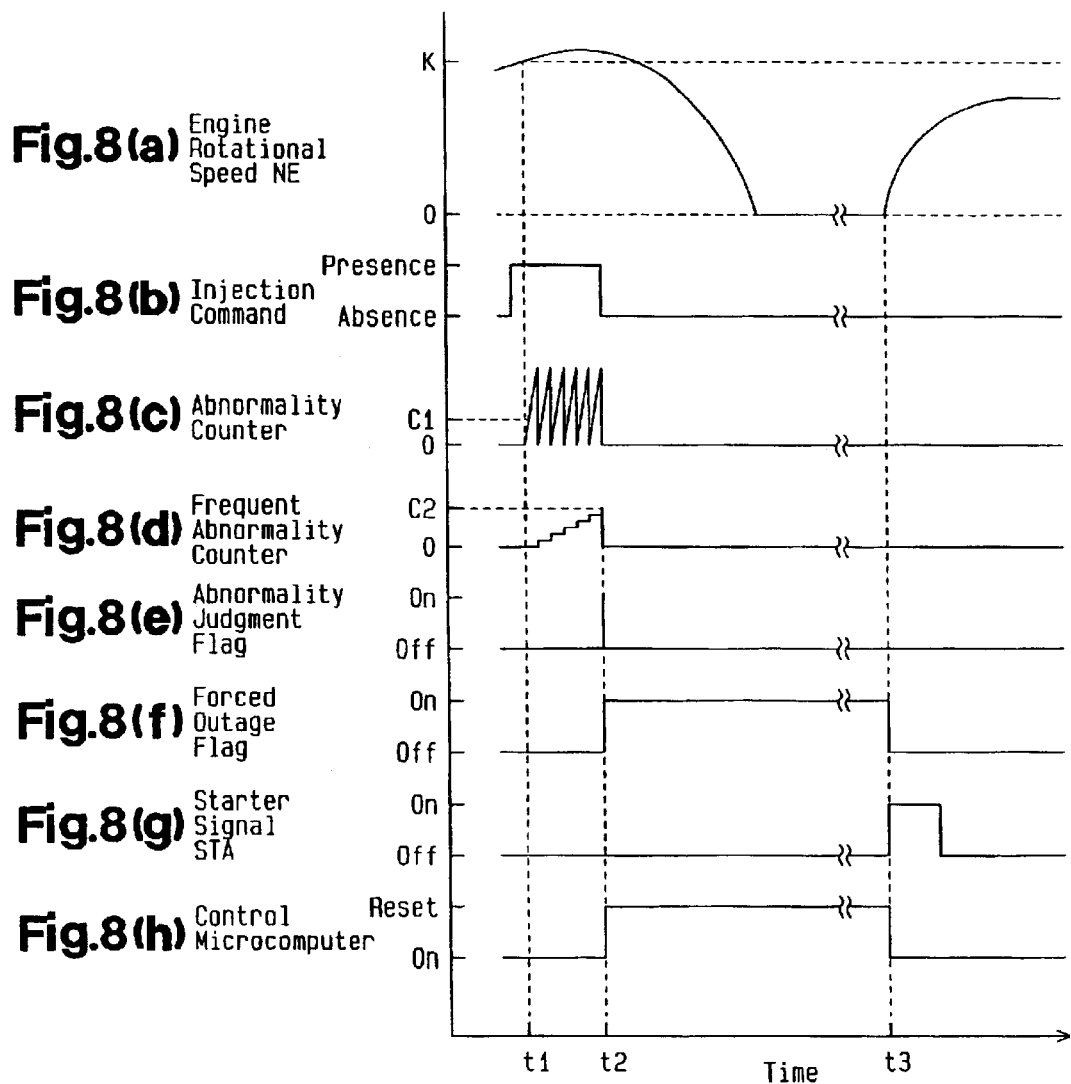

CONTROL APPARATUS FOR VEHICLE

BACKGROUND OF THE INVENTION

The present invention relates to a vehicular control apparatus that is suitable for an apparatus that executes several engine controls as a fail-safe process to allow a control system to take steps to correct a malfunction when there is an abnormality in a control system of a vehicle.

As electronically controlled vehicle engines become popular, engines and peripheral devices are increasingly controlled by electronic controls using mainly microcomputers.

Examples of such controls are a fuel injection control, which adjusts the injection amount and the injection timing of fuel supplied to cylinders of an engine using fuel injection valves, and an ignition timing control, which adjusts the timing to ignite a mixture of fuel and suction air inside each cylinder using an ignition plug. A system for electrically controlling the opening degree of a throttle valve, which is referred to as an electronic throttle system, is put into a practical use for adjusting the amount of air drawn into the engine. Such a system is also controlled by an electronic control using mainly the microcomputer.

Since such controls are performed by electronic controls, several detailed controls can be performed to maintain the output of an engine to an amount appropriate for the driving condition in each case. On the other hand, controls of manipulation members, such as the fuel injection valves, the ignition plugs, and the throttle valves, are executed by an apparatus that performs the electronic controls, that is, an electronic control unit. Therefore, when an abnormality occurs in the electronic control unit and the controls of the manipulation members are not maintained properly, the engine output might not be maintained properly.

Therefore, in general, when there is an abnormality in the electronic control unit, a first-aid engine control is performed to allow a control system to take steps to correct a malfunction after restricting the maximum output of the engine as a fail-safe process.

A control apparatus that has such fail-safe function is disclosed in the Journal of Technical Disclosure Publication No. 2000-1910 published by Japan Institute of Invention and Innovation. The apparatus is equipped with the above-mentioned electronic throttle system. When it is determined that there is an abnormality in the electronic control unit, a throttle valve is mechanically fixed to a predetermined opening degree by an auxiliary mechanism. This maintains the minimum amount of suction air required for a control system to take steps to correct a malfunction, which further prevents the engine from being stalled. Also, when the control system actually takes steps to correct the malfunction, the engine output is restricted by, for example, reducing the number of cylinders to be driven or correcting the ignition timing.

According to the conventional apparatus, a control system is allowed to take steps to correct a malfunction even if there is an abnormality in the electronic control unit.

However, in the case with the conventional apparatus, restriction of the engine output, such as reducing the number of cylinders to be driven and correcting of the ignition timing, is performed by the electronic control unit that has been determined to have an abnormality. Therefore, there is a fear that the restriction control of the engine output is not executed properly. Thus, there remains room for improvement.

SUMMARY OF THE INVENTION

Accordingly, the objective of the present invention is to provide a vehicular control apparatus that properly executes a fail-safe process after it is determined that there is an abnormality in an electronic control unit and that increases the reliability of a control performed by the electronic control unit even in a case where a control system takes steps to correct a malfunction.

To achieve the above objective, the present invention provides a vehicular control apparatus, which includes an engine and an electronic control unit. The engine is mounted to a vehicle. Air is drawn into the engine. The engine rotates at a rotational speed. The engine includes at least one manipulation member used for control of output of said engine. The electronic control unit controls the manipulation member in accordance with a driving condition of the engine. When it is determined that there is an abnormality in the electronic control unit, the amount of air drawn into the engine is fixed to a predetermined value and the amount of manipulation of the manipulation member is restricted. When the rotational speed of the engine becomes greater than a predetermined speed when it is determined that there is the abnormality in the electronic control unit, the electronic control unit determines that there is an abnormality relating to the manipulation of the manipulation member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 8(a) to 8(h) are timing charts showing an example of a process of the forced outage process according to the preferred embodiment.

DETAILED DESCRIPTION OF THE PREFERRED EMBODIMENTS

A vehicular control apparatus according to a preferred embodiment of the present invention will now be described with reference to FIGS. 1 and 2.

At first, the structures of a vehicle engine to which a vehicular control apparatus of the preferred embodiment is applied and peripheral devices are briefly explained with reference to FIG. 1.

Figure 1:
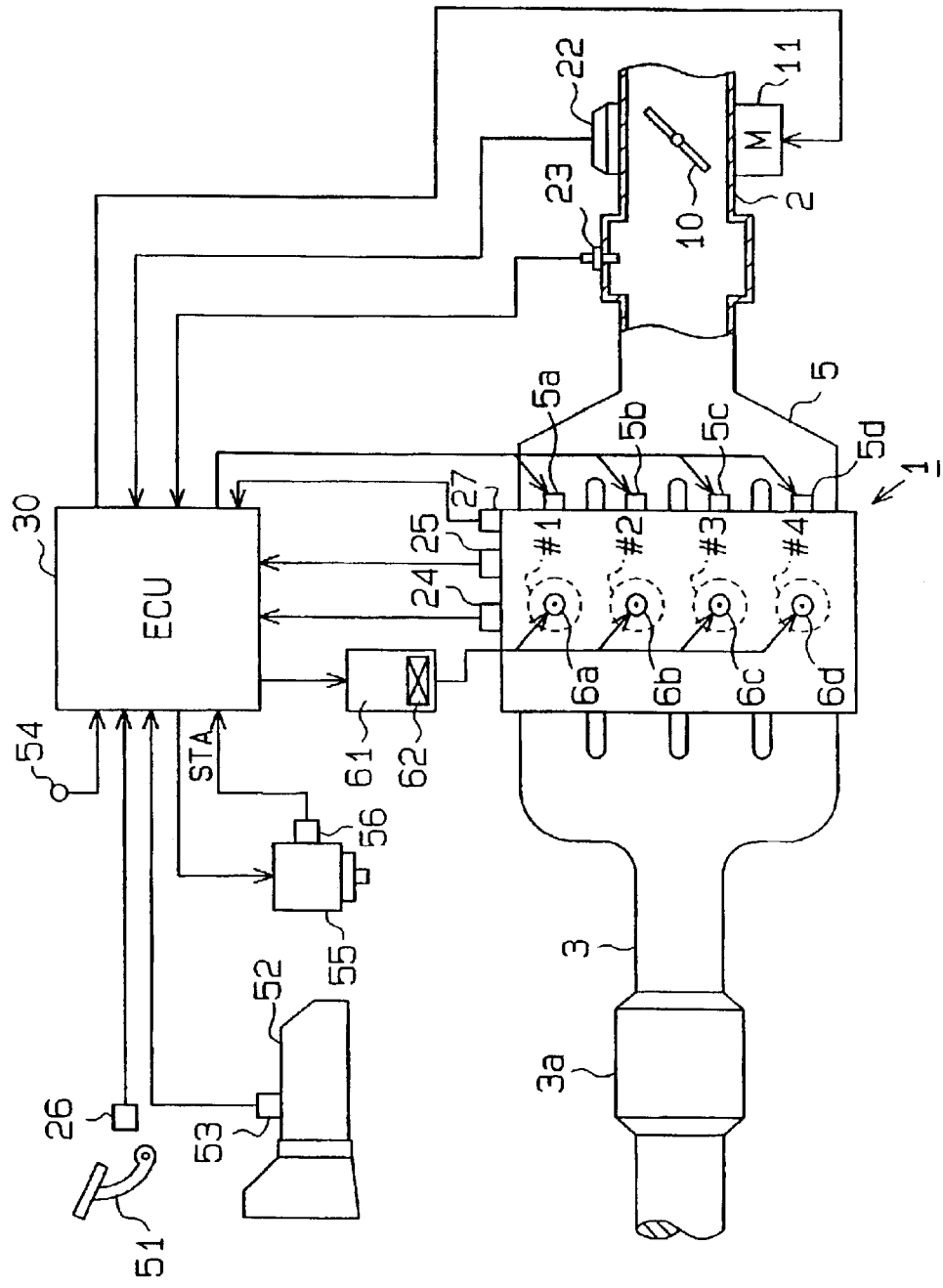
FIG. 1 is a block diagram illustrating a structure of a system of a vehicular control apparatus according to a preferred embodiment of the present invention.
Figure 2:
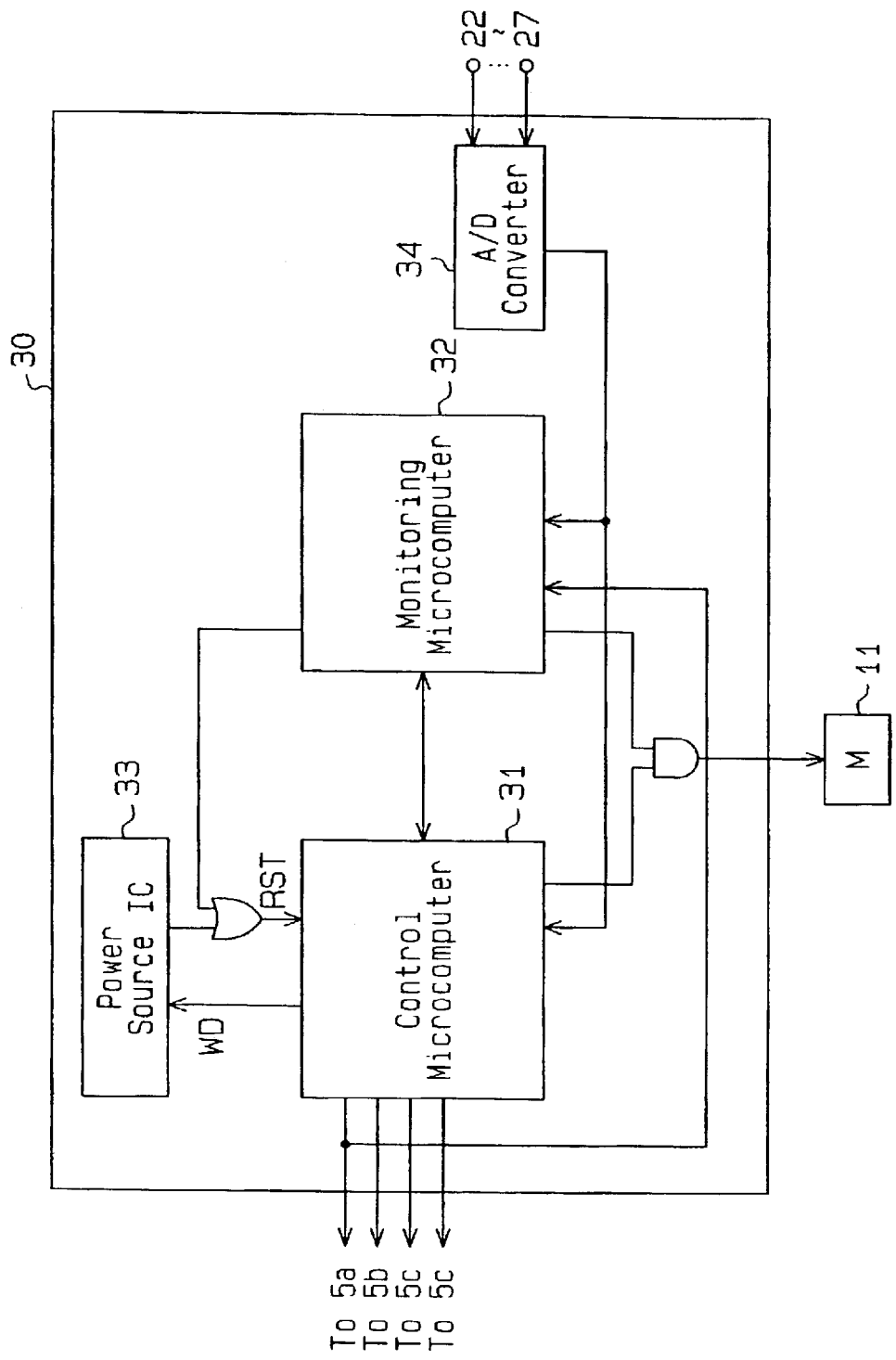
FIG. 2 is a block diagram illustrating a specific structure of an electronic control unit according to the preferred embodiment.

In FIG. 1, an engine 1 is, for example, an in-line four-cylinder type four-cycle engine. The engine 1 has an intake air passage 2. An air cleaner, which is not shown, is located at the upstream portion of the intake air passage 2. A throttle valve 10 is located downstream of the air cleaner. The throttle valve 10 is selectively opened and closed by a motor 11. The amount of air supplied to the engine 1 is adjusted in accordance with the opening degree of the throttle valve 10.

The throttle valve 10 has a throttle opening degree sensor 22 for detecting the opening degree TA of the throttle valve 10. An intake pressure sensor 23 for detecting the intake air amount to the engine 1 is located downstream the throttle valve 10 in the intake air passage 2.

The intake air passage 2 is connected to cylinders #1 to #4 of the engine 1 via an intake manifold 5. After air is drawn into the intake air passage 2, the amount of air is adjusted by the throttle valve 10. Then, the air is distributed to the cylinders #1 to #4 of the engine 1 via the intake manifold 5.

The intake manifold 5 includes fuel injection valves 5a, 5b, 5c, and 5d, which correspond to the cylinders #1 to #4, respectively. Fuel injected from each fuel injection valve 5a, 5b, 5c, or 5d, is mixed with the intake air from the intake air passage 2. The air-fuel mixture is then supplied to the corresponding one of the cylinders #1 to #4.

The cylinders #1 to #4 include ignition plugs 6a, 6b, 6c, and 6d, respectively. The air-fuel mixture supplied to each of the cylinders #1 to #4 of the engine 1 is combusted based on the activation of the corresponding ignition plug 6a, 6b, 6c, or 6d. Accordingly, a drive force is applied to a crankshaft (not shown). Exhaust gas resulting from the combustion of the air-fuel mixture is sent to an exhaust passage 3 from each of the cylinders #1 to #4. The exhaust gas is cleaned by a catalyst 3a before being discharged to the outside.

The ignition plugs 6a to 6d are connected to an igniter 61. The igniter 61 accommodates an ignition coil 62. The igniter 61 is a device that converts an ignition signal entered at an adequate timing to an electric power for activating each of the ignition plugs 6a to 6d using the ignition coil 62. Each of the ignition plugs 6a to 6d is activated by the power converted by the igniter 61 and ignites the air-fuel mixture supplied to the corresponding one of the cylinders #1 to #4 of the engine 1.

A crank-angle sensor 24, which detects the rotational speed (engine rotational speed NE) of the crankshaft, is located close to the crankshaft.

A camshaft, which is not shown, is operably coupled to the crankshaft. A cam-angle sensor 25 is located close to the camshaft. The cam-angle sensor 25 is used as a cylinder-distinguishing sensor. More-specifically, the cam-angle sensor 25 sends an adequate pulse signal when, for example, the first cylinder #1 is at a compression top dead center (TDC).

An acceleration pedal 51 is located inside a vehicle passenger compartment, which is not shown. An acceleration sensor 26 is located close to the acceleration pedal 51. The acceleration sensor 26 detects the amount of manipulation (acceleration opening degree PA) of the acceleration pedal 51.

A water-temperature sensor 27 is attached to the engine 1. The water-temperature sensor 27 detects the temperature THW of coolant used for cooling the engine 1.

In addition, the engine 1 is coupled to a power transmission system, which is an automatic transmission 52 in the preferred embodiment. The automatic transmission 52 shifts the gear of the vehicle. The automatic transmission 52 includes a shift position sensor 53 for detecting the shift position (gear position) of the automatic transmission 52. The shift position sensor 53 mainly detects whether the shift position of the automatic transmission 52 is at a neutral range (N) or a drive range (D). When the shift position of the automatic transmission 52 is manipulated to the N range, power is prevented from being transmitted in the power transmission system, which is from the crankshaft to an axle (not shown). When the shift position of the automatic transmission 52 is manipulated to the D range, power is transmitted in the power transmission system.

The engine 1 is provided with an ignition switch 54, which is manipulated by a driver to start the engine 1 and continue operating the engine 1. In addition, the engine 1 is provided with a starter motor 55 for starting the engine 1. When the driver manipulates the ignition switch 54 to a start position, the starter motor 55 is activated and the engine 1 is started. When the ignition switch 54 is manipulated to an on position after the engine 1 is started, the operation of the engine 1 is continued.

The starter motor 55 is provided with a starter switch 56 for detecting the operation of the starter motor 55. The starter switch 56 sends a starter signal STA. When the starter motor 55 is operating, the starter signal STA is sent as on, and when the starter motor 55 is stopped, the starter signal STA is sent as off.

Furthermore, the apparatus according to the preferred embodiment includes an electronic control unit (ECU) 30, which is formed by, for example, a microcomputer. The ECU 30 receives detection signals from the sensors 22 to 27 and the starter signal STA. The ECU 30 determines the driving condition of the engine 1 in accordance with the signals. The ECU 30 executes several controls relating to the engine controls, such as a drive control of the fuel injection valves 5a to 5d (a fuel injection control), a drive control of the ignition plugs 6a to 6d (an ignition timing control), an opening and closing control of the throttle valve 10 (a drive control of the motor 11), and a drive control of the starter motor 55, in accordance with the driving condition of the engine 1. In the preferred embodiment, the fuel injection valves 5a to 5d and the ignition plugs 6a to 6d correspond to manipulation members, which are manipulated by the ECU 30.

The structure of the ECU 30 will now be described with reference to FIG. 2.

The ECU 30 is formed by a control microcomputer 31, which executes several controls, a monitoring microcomputer 32, which determines whether there is an abnormality in the control microcomputer 31, and a power source IC 33, which supplies power to the microcomputers 31, 32.

The control microcomputer 31 and the monitoring microcomputer 32 are connected to each other such that a serial communication can be established between the control microcomputer 31 and the monitoring microcomputer 32. The control microcomputer 31 and the monitoring microcomputer 32 are connected to an A/D converter 34. The A/D converter 34 is connected to the sensors 22 to 27. In response to requests from the control microcomputer 31 and the monitoring microcomputer 32, the A/D converter 34 converts (A/D conversion) the detection signals (analog signals) of the sensors 22 to 27 to digital signals and sends the digital signals to the control microcomputer 31 and the monitoring microcomputer 32.

The control microcomputer 31 can be reset in accordance with a reset signal generated by the monitoring microcomputer 32 or the power source IC 33 at an arbitrary timing.

The control microcomputer 31 sends a watch dog pulse WD, which is inverted at every predetermined cycle, to the power source IC 33. The power source IC 33 monitors the watch dog pulse WD. If the waveform of the watch dog pulse WD deviates from a predetermined waveform, the power source IC 33 determines that there is an abnormality in the control microcomputer 31. The monitoring microcomputer 32 monitors the serial communication and the A/D conversion. If the serial communication and the A/D conversion are not performed properly, the monitoring microcomputer 32 determines that there is an abnormality in the control microcomputer 31.

On the other hand, the monitoring microcomputer 32 monitors an injection command sent to a particular fuel injection valve (in the preferred embodiment, the fuel injection valve 5a, which corresponds to the cylinder #1) from the control microcomputer 31. The monitoring microcomputer 32 forms a monitoring means.

The ECU 30 executes several controls relating to the engine controls when a manipulation command is sent from the control microcomputer 31 to the fuel injection valves 5a to 5d and the ignition plugs 6a to 6d at an adequate timing.

In the apparatus of the preferred embodiment, when an abnormality occurs in the control microcomputer 31, or when the opening degree of the throttle valve 10 does not achieve a target value of the control (or when the throttle fails), the power supply to the motor 11, which selectively opens and closes the throttle valve 10, is stopped. Further, the throttle valve 10 is provided with an auxiliary mechanism. The auxiliary mechanism retains the throttle valve 10 at a predetermined opening degree when the power supply to the motor 11 is stopped. That is, when there is an abnormality in the control microcomputer 31, the auxiliary mechanism retains the throttle valve 10 at the predetermined opening degree. Accordingly, the amount of air drawn into the engine 1 is maintained at a predetermined amount. At the same time, the control microcomputer 31 performs fail-safe processes, such as reducing the number of cylinders to be driven and correcting delay of the ignition timing. This reliably allows the control apparatus to take steps to correct a malfunction.

A throttle control apparatus, which includes the auxiliary mechanism and its peripheral structures, are described with reference to FIG. 3.

Figure 3:
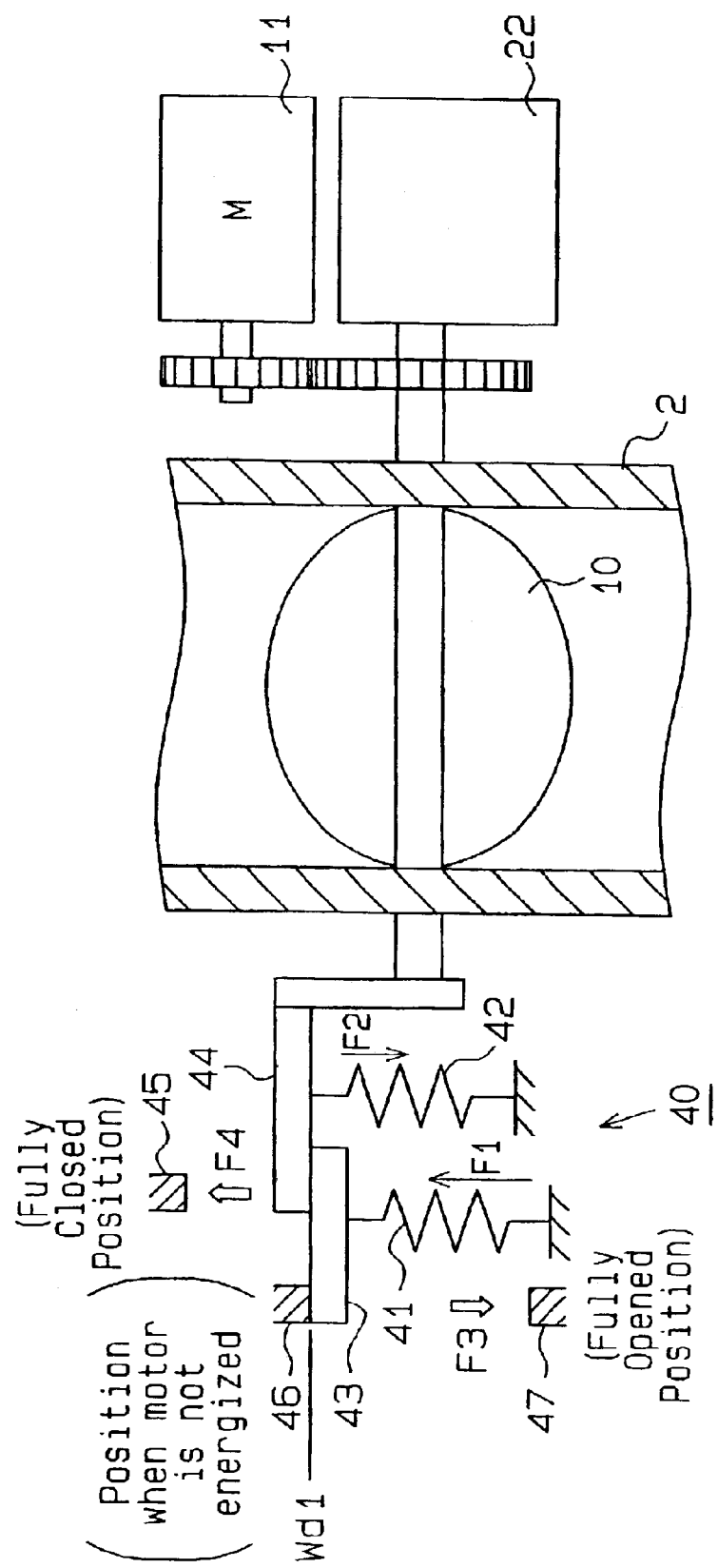
FIG. 3 is a schematic diagram illustrating a throttle control unit and a peripheral structure according to the preferred embodiment.

As shown in FIG. 3, in the throttle control apparatus of the preferred embodiment, power from the motor 11 is transmitted to the throttle valve 10 and is directly transmitted to the throttle opening degree sensor 22. The opening degree of the throttle valve 10 is directly reflected to the throttle opening degree sensor 22. The motor 11 is controlled by the ECU 30, which is shown in FIG. 1.

Furthermore, the throttle valve 10 is provided with an auxiliary mechanism 40, which utilizes springs. When there is an abnormality in the control microcomputer 31 of the ECU 30, or when the throttle fails, the auxiliary mechanism 40 retains the throttle valve 10 at a predetermined opening degree Wd1.

The auxiliary mechanism 40 includes a valve lever 44, which is coupled to the throttle valve 10, and a valve return lever 43, which can be operated separately from the valve lever 44. A spring 42 is located on the valve lever 44 and is used when the control apparatus takes steps to correct a malfunction of the ECU 30. The spring 42 urges the throttle valve 10 in a valve opening direction by a force F2. A valve return spring 41 is located on the valve return lever 43. The valve return spring 41 urges the valve lever 44 in a valve closing direction by a force F1.

The force F1 of the valve return spring 41 and the force F2 of the spring 42 have a relationship represented by the following inequality.

F1>F2

However, an intermediate stopper 46 is located on the valve return lever 43. Therefore, if the power supply to the motor 11 is stopped when, for example, there is an abnormality in the control microcomputer 31, the position of the valve return lever 43 with respect to the valve lever 44, or the opening degree of the throttle valve 10, is fixed to a state shown in FIG. 3. The opening degree of the throttle valve 10 is fixed at the predetermined opening degree Wd1. The opening degree of the fixed throttle valve 10 is generally set, by the intermediate stopper 46, to a degree slightly greater than the opening degree of the throttle valve required when the engine 1 is idling.

When an abnormality occurs in the control microcomputer 31 of the ECU 30, or when the throttle fails, the opening degree of the throttle valve 10 is fixed to the predetermined opening degree Wd1. This maintains the minimum amount of intake air required for allowing the control apparatus to correct the malfunction.

On the other hand, to drive the throttle valve 10 in the valve opening direction by the motor 11 when the control microcomputer 31 is operating properly, the valve lever 44 and the valve return lever 43 are depressed in a direction shown by an arrow F3 in FIG. 3 against the force F1 of the valve return spring 41. The throttle valve 10 is fully opened when the valve return lever 43 abuts against a full-open stopper 47.

To drive the throttle valve 10 in the valve closing direction by the motor 11 when the control microcomputer 31 is operating properly, the valve lever 44 is pressed in a direction shown by an arrow F4 in FIG. 3 against the force F2 of the spring 42. The throttle valve 10 is fully closed when the valve lever 44 abuts against a full-close stopper 45.

In the preferred embodiment, to improve the reliability of the fail-safe processes, the operations of the fuel injection valves 5a to 5d and the ignition plugs 6a to 6d are forcibly stopped when the engine rotational speed NE is greater than a predetermined speed K. The predetermined speed K is set to a value slightly higher than the maximum rotational speed achieved by the engine rotational speed NE during the fail-safe process executed when the control apparatus takes steps to correct the malfunction of the ECU 30.

According to this structure, when the engine rotational speed NE is greater than the predetermined speed K, it is determined that the fail-safe process can not restrict the engine output properly, since the engine rotational speed NE is excessively high. In the apparatus of the preferred embodiment, the monitoring microcomputer 32 also functions as determining means for determining such abnormality.

Further, when it is determined that there is an abnormality (a restricted abnormality), the engine 1 is promptly stopped by forcibly stopping the operations of the fuel injection valves 5a to 5d and the ignition plugs 6a to 6d.

The engine rotational speed NE increases regardless of the fail-safe process when, for example, the vehicle is descending a slope. Therefore, if an excessive increase is detected when the engine rotational speed NE becomes greater than the predetermined speed K, the monitoring microcomputer 32 might determine that the engine rotational speed NE is excessively increased by the restricted abnormality although, in fact, the engine rotational speed NE is increased because the vehicle is descending a slope.

In the apparatus of the preferred embodiment, when the acceleration opening degree PA is low and the engine rotational speed NE exceeds the predetermined speed K, the engine is driven with a reduced number of cylinders. That is, driving of two fuel injection valves including at least the particular fuel injection valve 5a is stopped. If the engine rotational speed NE still exceeds the predetermined speed K, the operations of the fuel injection valves 5a to 5d and the ignition plugs 6a to 6d are forcibly stopped only when a command (injection command) to operate the particular fuel injection valve 5a is sent from the control microcomputer 31. That is, the operations of the fuel injection valves 5a to 5d and the ignition plugs 6a to 6d are forcibly stopped only when fuel is erroneously injected through the particular fuel injection valve 5a. This prevents the engine 1 from being stopped based on an erroneous judgment.

In the apparatus of the preferred embodiment, the predetermined speed K is set to a different value for when the shift position of the automatic transmission 52 is manipulated to the N range than when the shift position of the automatic transmission 52 is manipulated to the D range. More specifically, the predetermined speed K when the shift position of the automatic transmission 52 is manipulated to the D range is greater than the predetermined speed K when the shift position of the automatic transmission 52 is manipulated to the N range. The reason will be described below.

In the apparatus of the preferred embodiment, the maximum speed NEmax and the minimum speed NEmin of the engine rotational speed NE are set while the control apparatus takes steps to correct the malfunction of the ECU 30. The fail-safe processes, such as reducing the number of the cylinders to be driven and correcting delay of the ignition timing, are performed such that the engine rotational speed NE basically falls within a predetermined speed range defined by the maximum speed NEmax and the minimum speed NEmin.

The load applied to the crankshaft when the shift position is manipulated to the N range is less than the load applied to the crankshaft when the shift position is manipulated to the D range. The variation amount of the engine rotational speed NE with respect to the delaying amount of the ignition timing when the shift position is manipulated to the N range is less than the variation amount when the shift position is manipulated to the D range. Therefore, when the ignition timing is delayed to decrease the engine rotational speed NE when the shift position is manipulated to the N range, the delaying amount is great.

As is well known, if the delaying amount is excessively increased when the engine rotational speed NE is low, the driving condition of the engine 1 becomes unstable. Therefore, in the apparatus of the preferred embodiment, the predetermined speed range when the shift position of the automatic transmission 52 is manipulated to the N range is set to a speed range that is higher than a speed range when the shift position of the automatic transmission 52 is manipulated to the D range. Accordingly, the engine output is adjusted in a suitable manner in accordance with the manipulation state of the shift position.

The predetermined speed K is set as a value for determining that the engine rotational speed NE is excessively high on the condition that the engine rotational speed NE exceeds the maximum speed NEmax. Therefore, by setting the predetermined speed K for when the shift position of the automatic transmission 52 is manipulated to the N range higher than the predetermined speed K for when the shift position of the automatic transmission 52 is manipulated to the D range, the predetermined speed K is set corresponding to the maximum speed NEmax, which differs depending on the manipulated state of the shift position.

As is also well known, the friction of engine 1 increases as the temperature of the engine 1 decreases. Therefore, in the apparatus of the preferred embodiment, when the coolant temperature THW, which reflects the temperature of the engine 1 in a suitable manner, decreases, the predetermined speed range, which is defined by the maximum speed NEmax and the minimum speed NEmin, is set higher to drive the engine 1 in a stable manner against the friction of engine 1.

Routines of the fail-safe process and for forcibly stopping the operations of the fuel injection valves 5a to 5d and the ignition plugs 6a to 6d will be described with reference to flowcharts shown in FIGS. 4 to 7.

Figure 4:
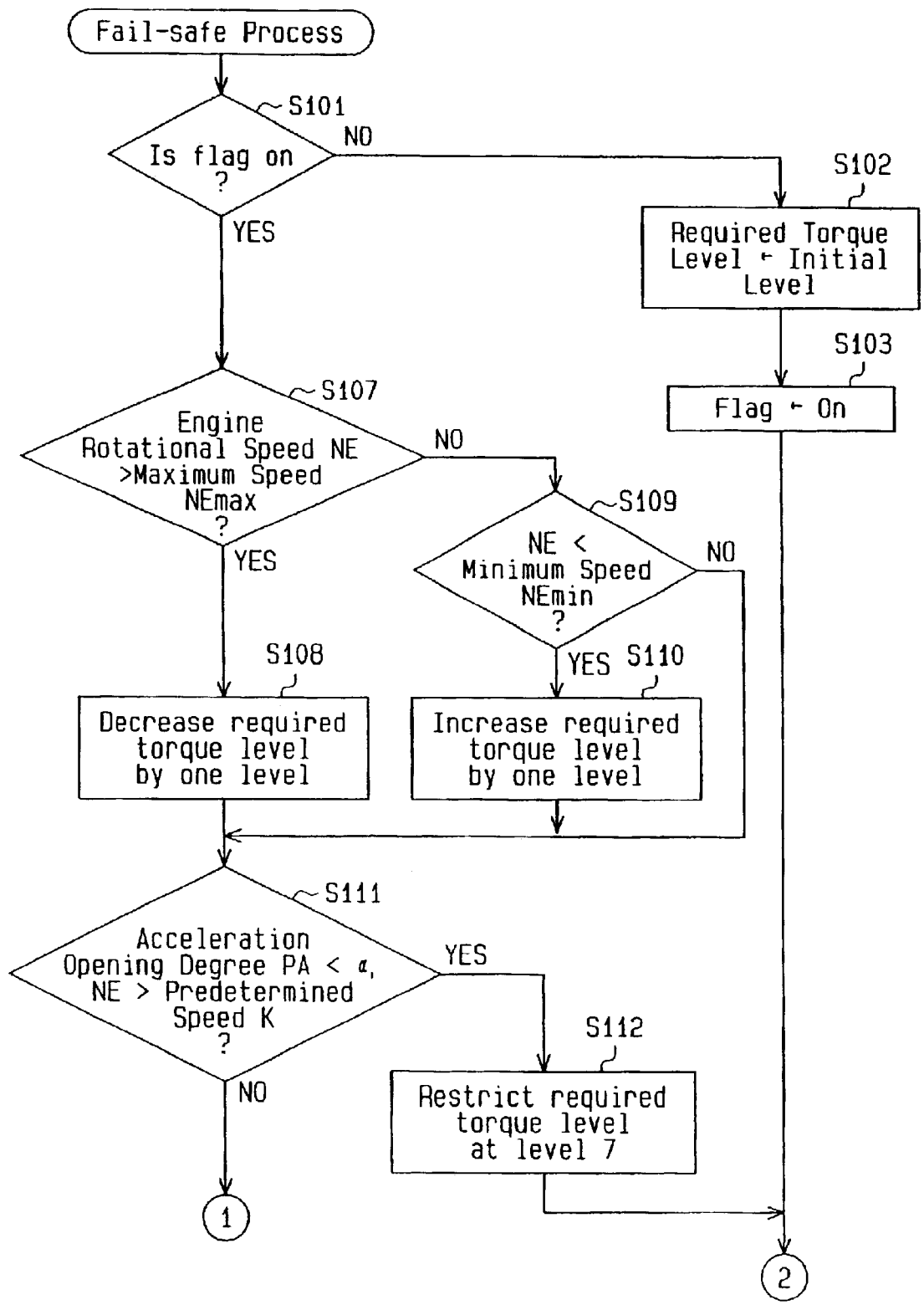
FIGS. 4 and 5 are flowcharts showing routines of a fail-safe process.
Figure 5:
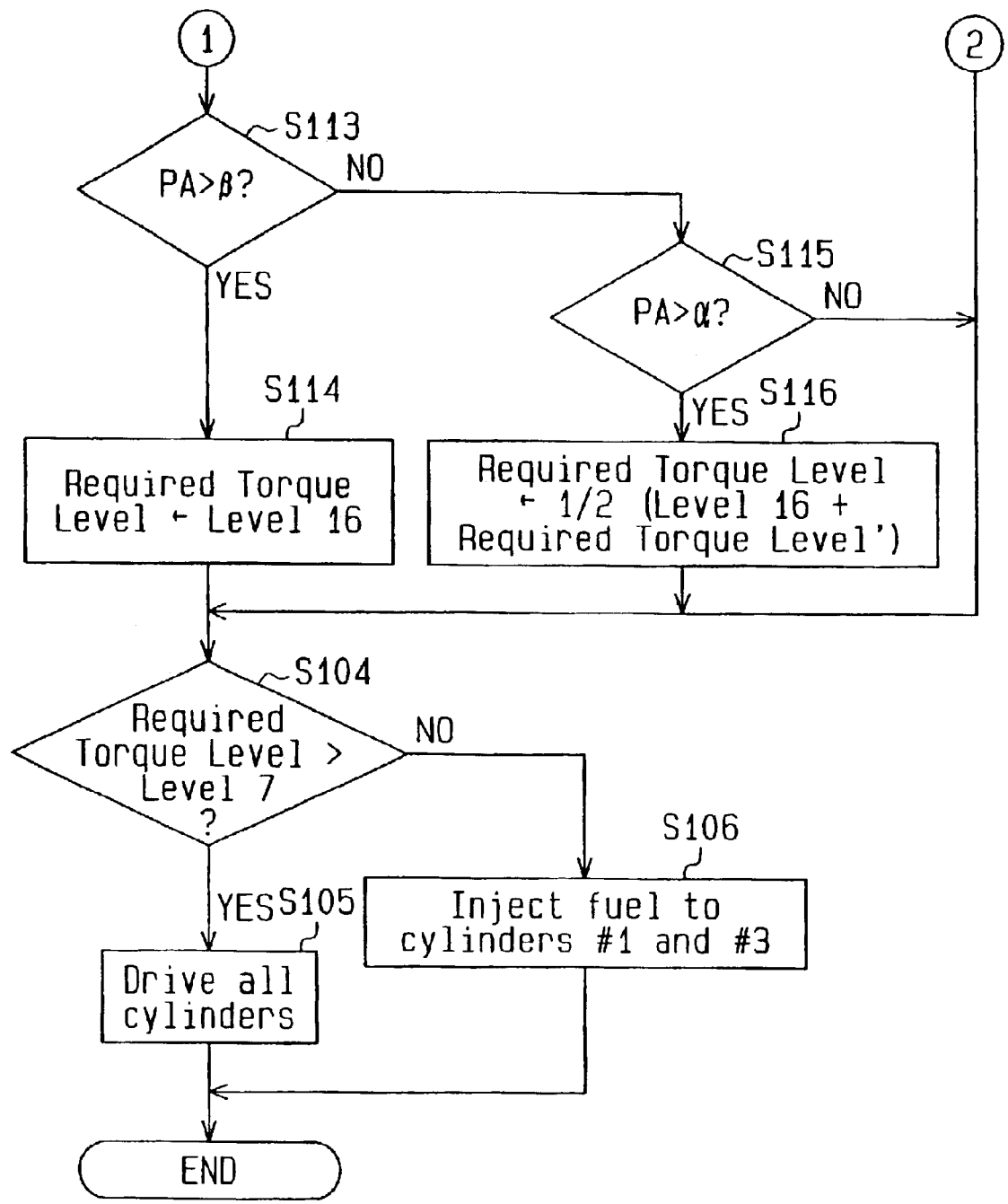
Figure 6:
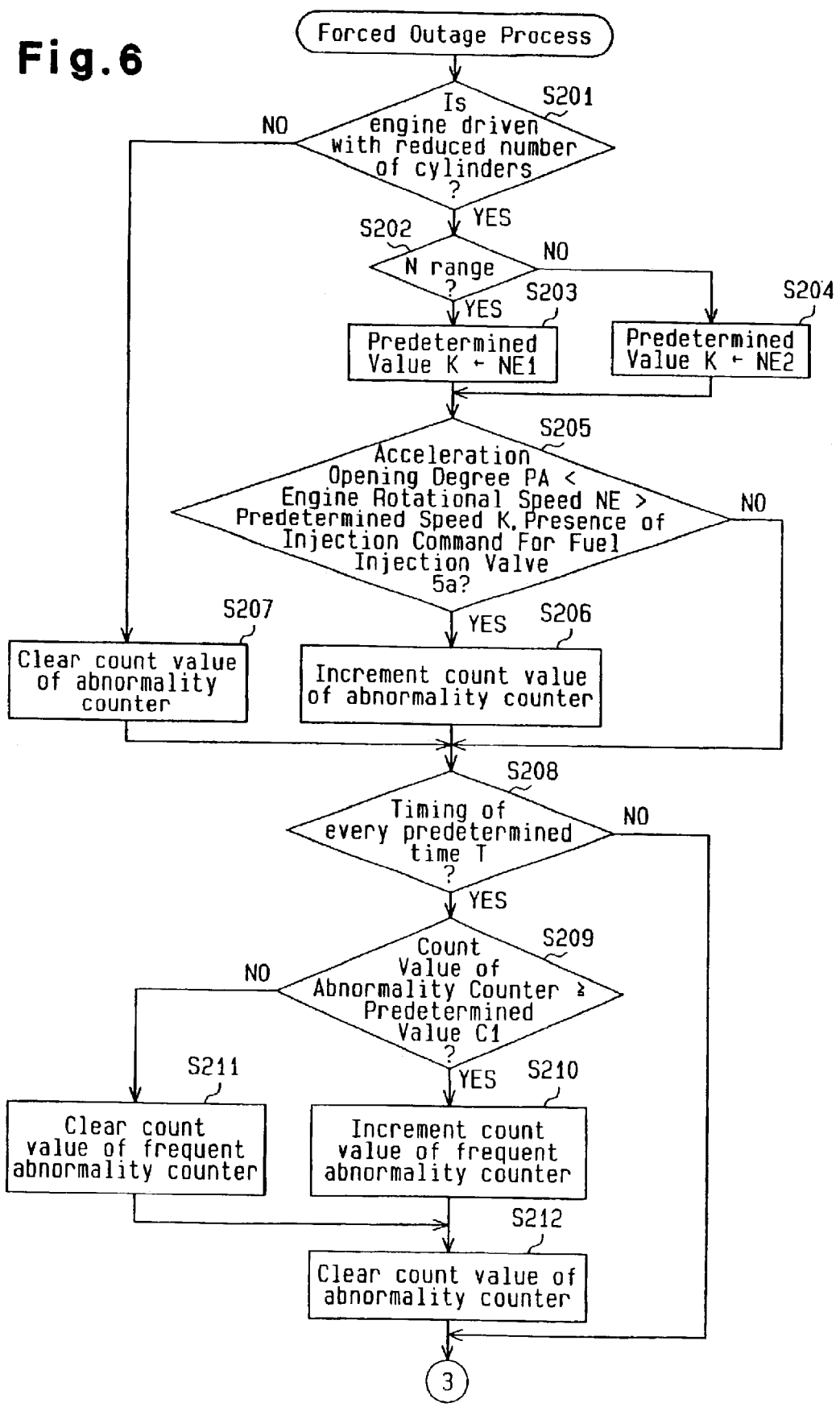
FIGS. 6 and 7 are flowcharts showing routines of a forced outage process.
Figure 7:
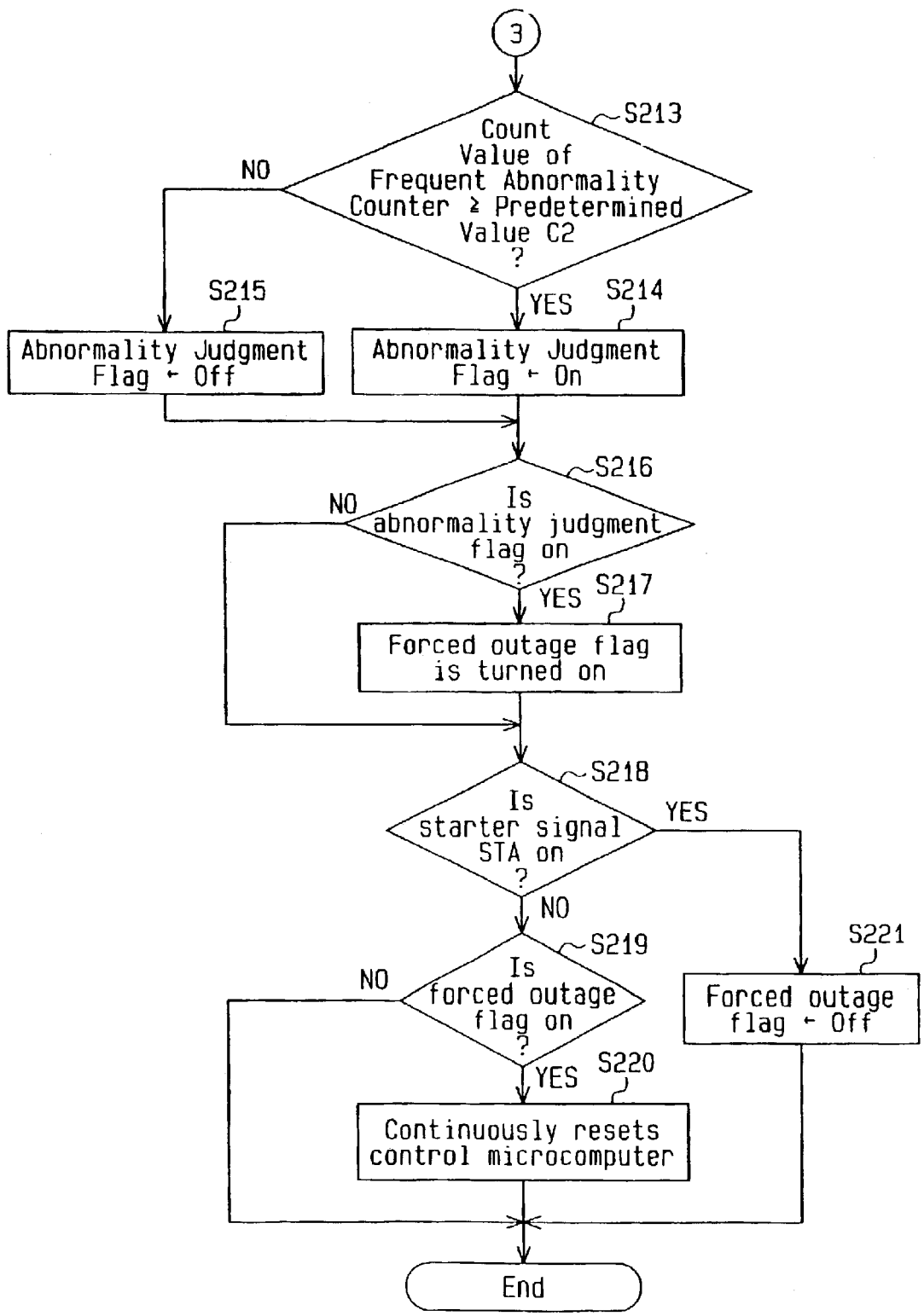

FIGS. 4 and 5 show routines of the fail-safe process. FIGS. 6 and 7 show routines for forcibly stopping the operations of the fuel injection valves 5a to 5d and the ignition plugs 6a to 6d.

The routines of the fail-safe process will now be described with reference to FIGS. 4 and 5. The steps illustrated in the flowcharts of FIGS. 4 and 5 are executed when there is an abnormality in the control microcomputer 31 or when the throttle fails, and are executed by the control microcomputer 31 as an interruption process at every predetermined time after detecting the abnormality.

In the fail-safe process as shown in FIG. 4, it is first determined whether a flag is on in step S101. The flag is turned on (step S103) when the fail-safe process is executed for the first time after a driver turns on the ignition switch 54. The flag is turned off when the ignition switch 54 is turned off.

If it is determined that the flag is off, that is, if the decision outcome of step S101 is negative, it is determined that the fail-safe process will be executed for the first time after the ignition switch 54 is turned on and the control microcomputer 31 proceeds to step S102. In step S102, an initial level of a required torque level is determined from a map based on the coolant temperature THW.

The required torque level is a level particularly for setting the delaying amount of the ignition timing at multi-level when adjusting the engine output. More specifically, the required torque level includes levels 1 to 16. The map is for selecting and determining the initial level of the required torque level based on the coolant temperature THW. The map is obtained by an experiment on the relationship between the coolant temperature THW and the initial level that permits the engine 1 to be driven in a stable manner against the friction of engine 1. The map is stored in the control microcomputer 31 in advance.

The output torque of the engine 1 is adjusted by correcting delay of the ignition timing and driving the engine with the reduced number of cylinders, which is adequately performed by a process described later (steps S104 to S106 in FIG. 5). The correction of the delay and the reduction of the cylinders are specified by the required torque level. The output torque of the engine 1 is increased as the required torque level approaches the level 16 by the correction of the delay of the ignition timing and the reduction of the number of the cylinders.

Subsequently, the flag is turned on in step S103. Then, in step S104 of FIG. 5, it is determined whether the determined required torque level is greater than level 7. If it is determined that the required torque level is greater than level 7, that is, if the decision outcome of step S104 is positive, the control microcomputer 31 proceeds to step S105. That is, fuel is injected to all the cylinders #1 to #4 at this time. On the other hand, if it is determined that the required torque level is less than or equal to level 7, that is, if the decision outcome of step S104 is negative, the control microcomputer 31 proceeds to step S106 and drives only two fuel injection valves 5*a* and 5*c*. That is, the engine is driven with the reduced number of cylinders and fuel is injected to only two cylinders #1 and #3 at this time. As described above, the routine is temporarily terminated after selecting to drive the engine with all cylinders or reduced number of cylinders.

When the routine is executed subsequently, the required torque level that is set to the initial level is updated in accordance with the engine rotational speed NE in each case.

If it is determined that the flag is on, that is, if the decision outcome of step S101 in FIG. 4 is positive, the control microcomputer 31 proceeds to step S107. In step S107, the maximum speed NEmax is calculated, and then it is determined whether the engine rotational speed NE is greater than the maximum speed NEmax. The maximum speed NEmax is calculated based on the coolant temperature THW and the shift position of the automatic transmission 52. For example, when the automatic transmission 52 is in the N range, the speed of 1600 rpm is assigned as the maximum speed NEmax, and when the automatic transmission 52 is in the D range, the speed of 1200 rpm is assigned as the maximum speed NEmax.

If it is determined that the engine rotational speed NE is greater than the maximum speed NEmax, that is, if the decision outcome of step S107 is positive, the control microcomputer 31 determines that the engine rotational speed NE needs to be reduced and proceeds to step S108. In step S108, the control microcomputer 31 lowers the required torque level by one level.

On the other hand, if it is determined that the engine rotational speed NE is less than or equal to the maximum speed NEmax, that is, if the decision outcome of step S107 is negative, the control microcomputer 31 proceeds to step S109. In step S109, the minimum speed NEmin is calculated and it is determined whether the engine rotational speed NE is less than the minimum speed NEmin. The minimum speed NEmin is also calculated based on the coolant temperature THW and the shift position of the automatic transmission 52 in the same manner as the maximum speed NEmax. For example, when the automatic transmission 52 is in the N range, the minimum speed NEmin is calculated to be equal to or more than 950 rpm, and when the automatic transmission 52 is in the D range, the minimum speed NEmin is fixed to 950 rpm regardless of the coolant temperature THW.

If it is determined that the engine rotational speed NE is less than the minimum speed NEmin, that is, if the decision outcome of step S109 is positive, the control microcomputer 31 determines that the engine rotational speed NE needs to be increased and proceeds to step S110. In step S110, the required torque level is increased by one level.

If it is determined that the engine rotational speed NE is less than the maximum speed NEmax and greater than or equal to the minimum speed NEmin, that is if the decision outcome of step S107 is negative and the decision outcome of step S109 is negative, the required torque level is not updated since the engine rotational speed NE is within an appropriate speed range (the predetermined speed range).

Then, in step S111, it is determined whether the following conditions (a) and (b) are satisfied after the required torque level is updated in accordance with the engine rotational speed NE.

The condition (a) is that the acceleration opening degree PA is less than a predetermined opening degree α. The predetermined opening degree α is set to an acceleration opening degree that is obtained when a driver slightly depresses the acceleration pedal 51 but not enough for accelerating the vehicle (for example, 10 degrees).

The condition (b) is that the engine rotational speed NE is greater than the predetermined speed K. The predetermined speed K is determined by a process, which will be described later (steps S202 to S204 of FIG. 6). The predetermined speed K is calculated based on the coolant temperature THW such that the speed satisfies the following relational expression of the predetermined speed K, the minimum speed NEmin, and the maximum speed NEmax.

$$NEmin < NEmax < K$$

In step S111, it is determined whether the driving condition of the engine 1 is abnormal based on the conditions (a) and (b). That is, whether the engine rotational speed NE is excessively high although the acceleration pedal 51 is not depressed by a large amount.

If it is determined that the conditions (a) and (b) are both satisfied, that is, if the decision outcome of step S111 is positive, the control microcomputer 31 determines that there is an abnormality and proceeds to step S112. In step S112, the required torque level is restricted to level 7.

On the other hand, if it is determined either of the conditions (a), (b) is not satisfied, that is, if the decision outcome of step S111 is negative, the required torque level is updated in accordance with the acceleration opening degree PA by the following process (steps S113 to S116 of FIG. 5).

That is, in step S113, it is determined whether the acceleration opening degree PA is greater than a predetermined opening degree β. The predetermined opening degree β is set to an opening degree such that the relationship between the predetermined opening degree α and β satisfies the relational expression α<β. In step S113, it is determined whether the driver is depressing the acceleration pedal 51 on the intention to accelerate the vehicle.

If it is determined that the acceleration opening degree PA is greater than the predetermined opening degree β, that is, if the decision outcome of step S113 is positive, the control microcomputer 31 proceeds to step S114. In step S114, the required torque level is increased to the maximum level, which is level 16, to promptly accelerate the vehicle.

If it is determined that the acceleration opening degree PA is less than the predetermined opening degree β, that is, if the decision outcome of step S113 is negative, the control microcomputer 31 proceeds to step S115. In step S115, it is determined whether the acceleration opening degree PA is greater than the predetermined opening degree α. If it is determined that the acceleration opening degree PA is greater than the predetermined opening degree α, that is, if the decision outcome of step S115 is positive, the control microcomputer 31 proceeds to step S116. In step S116, the required torque level is calculated by the following expression based on the previously updated required torque level'.

$$\text{Required Torque Level} \leftarrow \frac{1}{2}(\text{Level } 16 + \text{Required Torque Level}')$$

That is, in this case, the required torque level is updated gradually to approach the level 16 every time the routine is executed.

On the other hand, if it is determined that the acceleration opening degree PA is less than or equal to the predetermined opening degree α, that is, if the decision outcome of step S113 is negative and the decision outcome of step S115 is negative, the required torque level is not updated.

In this routine, after the required torque level is updated adequately in accordance with the acceleration opening degree PA, the control microcomputer 31 selects to drive with all cylinders or with the reduced number of cylinders in accordance with the required torque level through the above-mentioned routine (steps S104 to S106). Subsequently, the routine is temporarily terminated.

The routine for forcibly stopping the operations of the fuel injection valves 5a to 5d and the ignition plugs 6a to 6d (a forced outage process) will now be described with reference to FIGS. 6 and 7. The steps illustrated in the flowcharts of FIGS. 6 and 7 are executed when there is an abnormality in the control microcomputer 31 or when the throttle fails in the same manner as the above-mentioned fail-safe process. The process is executed by the monitoring microcomputer 32 as an interruption process at every predetermined time (for example, every 16 ms).

As shown in FIG. 6, in step S201, it is determined whether the engine is driven with the reduced number of cylinders.

If it is determined that the engine is driven with the reduced number of cylinders, that is, if the decision outcome of step S201 is positive, the predetermined speed K is set in accordance with the following process (steps S202 to S204).

At first, it is determined whether the shift position of the automatic transmission 52 is in the N range in step S202. If it is determined that the shift position of the automatic transmission 52 is in the N range, that is, if the decision outcome of step S202 is positive, the monitoring microcomputer 32 proceeds to step S203. In step S203, the predetermined speed K is set to a predetermined speed NE1 (for example 2000 rpm).

On the other hand, if it is determined that the shift position of the automatic transmission 52 is not in the N range, that is, if the decision outcome of step S202 is negative, the monitoring microcomputer 32 proceeds to step S204. In step S204, the predetermined speed K is set to a predetermined speed NE2 (for example, 1600 rpm).

After the predetermined speed K is set in accordance with the shift position of the automatic transmission 52, it is determined whether the following conditions (c), (d), and (e) are satisfied in step S205.

The condition (c) is that the acceleration opening degree PA is less than the predetermined opening degree α.

The condition (d) is that the engine rotational speed NE is greater than the predetermined speed K.

The condition (e) is that the fuel injection command is sent to the fuel injection valve 5a.

If all the conditions are satisfied, that is, if the decision outcome of step S205 is positive, it is determined that the engine rotational speed NE is excessively high although the driver has no intention to accelerate the vehicle and the fuel is injected erroneously. Therefore, in step S206, a count value of an abnormality counter is incremented.

On the other hand, if it is determined that any of the conditions (c) to (e) is not satisfied, that is, if the decision outcome of step S205 is negative, the monitoring microcomputer 32 does not increment the abnormality counter, or skips the process of step S206, and proceeds to the next step.

If it is determined that the engine is not driven with the reduced number of cylinders, that is, if the decision outcome of step S201 is negative, the monitoring microcomputer 32 proceeds to step S207. In step S207, the count value of the abnormality counter is cleared.

After the count value of the abnormality counter is manipulated as required, it is determined whether the abnormality is caused frequently by the following process (steps S208 to S212). The abnormality corresponds to a state where the engine rotational speed NE is excessive although the driver has no intention to accelerate the vehicle and the fuel is injected erroneously.

In step S208, it is determined whether a detecting timing has come after a time interval of a predetermined time T (for example, approximately 500 ms) from when the forced outage process has been started.

If it is determined that the detecting timing has come, that is, if the decision outcome of step S208 is positive, the monitoring microcomputer 32 proceeds to step S209. In step S209, it is determined whether the count value of the abnormality counter is greater than or equal to a predetermined value C1 (for example, three) at the time the detecting timing has come.

If it is determined that the count value of the abnormality counter is greater than or equal to the predetermined value C1, that is, if the decision outcome of step S209 is positive, the monitoring microcomputer 32 determines that the abnormality is caused frequently and proceeds to step S210. In step S210, the count value of a frequent abnormality counter is incremented.

On the other hand, if it is determined that the count value of the abnormality counter is less than the predetermined value C1, that is, if the decision outcome of step S209 is negative, the monitoring microcomputer 32 proceeds to step S211. In step S211, the count value of the frequent abnormality counter is cleared. After the count value of the frequent abnormality counter is manipulated in accordance with the count value of the abnormality counter, the count value of the abnormality counter is cleared in step S212.

If it is determined that the timing of every predetermined time T has not come, that is, if the decision outcome of step S208 is negative, the monitoring microcomputer 32 does not manipulate the count value of the abnormality counter and the frequent abnormality counter. That is, the monitoring microcomputer 32 skips steps S209 to S212 and proceeds to the next step.

After that, an abnormality judgment flag is manipulated in accordance with the account value of the frequent abnormality counter by the following process (steps S213 to S215 of FIG. 7).

In step S213, it is determined whether the count value of the frequent abnormality counter is greater than or equal to a predetermined value C2 (for example, six). If it is determined that the count value is greater than or equal to the predetermined value C2, that is, if the decision outcome of step S213 is positive, the monitoring microcomputer 32 proceeds to step S214. In step S214, the abnormality judgment flag is turned on.

On the other hand, if it is determined that the count value of the frequent abnormality counter is less than the predetermined value C2, that is, if the decision outcome of step S213 is negative, the monitoring microcomputer 32 proceeds to step S215. In step S215, the abnormality judgment flag is turned off.

As described above, after manipulating the abnormality judgment flag, a forced outage flag is manipulated in accordance with the state of the abnormality judgment flag.

In step S216, it is determined whether the abnormality judgment flag is turned on. If it is determined that the abnormality judgment flag is turned on, that is, if the decision outcome of step S216 is positive, the monitoring microcomputer 32 proceeds to step S217. In step S217, the forced outage flag is turned on. On the other hand, if it is determined that the abnormality judgment flag is turned off, that is, if the decision outcome of step S216 is negative, the forced outage flag is not manipulated. That is, the monitoring microcomputer 32 skips step S217.

As described above, after the forced outage flag is manipulated, the operations of the fuel injection valves 5a to 5d and the ignition plugs 6a to 6d are forcibly stopped by the following process (steps S218 to S221). The forced outage is performed by continuously sending reset signals from forced outage means, which is the monitoring microcomputer 32, to the control microcomputer 31 so that the control microcomputer 31 is kept initialized.

More specifically, in step S218, it is determined whether the starter signal STA is detected as on. If it is determined that the starter signal STA is detected as off, that is, if the decision outcome of step S218 is negative, the monitoring microcomputer 32 proceeds to step S219. In step S219, it is determined whether the forced outage flag is on.

If it is determined that the forced outage flag is on, that is, if the decision outcome of step S219 is positive, the monitoring microcomputer 32 proceeds to step S220. In step S220, a continuous reset of the control microcomputer 31 is executed. That is, at this time, the operations of the fuel injection valves 5a to 5d and the ignition plugs 6a to 6d are forcibly stopped. As a result, the engine 1 is forcibly stopped. The continuous reset means to send the reset signals continuously to the control microcomputer 31 from the monitoring microcomputer 32 so that the control microcomputer 31 is kept initialized.

On the other hand, if it is determined that the forced outage flag is turned off, that is, if the decision outcome of step S219 is negative, the continuous reset of the control microcomputer 31 is not executed. That is, the monitoring microcomputer 32 skips step S220. In this case, the operations of the fuel injection valves 5a to 5d and the ignition plugs 6a to 6d are continued and the control apparatus is allowed to take steps to correct the malfunction.

If it is determined that the starter signal STA is detected as on, that is, if the decision outcome of step S218 is positive, the monitoring microcomputer 32 proceeds to step S221. In step S221, the forced flag is turned off. Accordingly, the engine 1 can be restarted even after the forced outage flag is turned off and the engine 1 is forcibly stopped.

As described above, the routine is temporarily terminated after the operations of the fuel injection valves 5a to 5d and the ignition plugs 6a to 6d are forcibly stopped as required.

The steps for performing the above-mentioned forced outage process will now be described with reference to a timing chart of FIG. 8. FIG. 8 shows one example of the forced outage process in the case where the following conditions are satisfied.

The required torque level is set to the level 7 or a lower level.

The shift position of the automatic transmission 52 is manipulated to the N range.

The acceleration pedal 51 is not depressed.

FIG. 8 shows the transition of the following items.
(a) The engine rotational speed NE
(b) Presence or absence of an injection command sent to the fuel injection valve 5a
(c) The count value of the abnormality counter
(d) The count value of the frequent abnormality counter
(e) The manipulation state of the abnormality judgment flag
(f) The manipulation state of the forced outage flag
(g) The detection state of the starter signal STA
(h) The operation state of the control microcomputer 31

The forced outage flag is off as shown by FIG. 8(f) when the engine rotational speed NE is less than the predetermined speed K, as shown by FIG. 8(a), or before a timing t1. Therefore, the operations of the necessary fuel injection valves 5a to 5d and the ignition plugs 6a to 6d are continued and the control apparatus is allowed to take steps to correct the abnormality of the ECU 30.

Subsequently, at time t1, when the engine rotational speed NE becomes greater than the predetermined speed K as shown by FIG. 8(a) and the injection command is sent to the fuel injection valve 5a as shown by FIG. 8(b), the count value of the abnormality counter is incremented as shown by FIG. 8(c).

Then, at the time between t1 and t2 when the count value of the abnormality counter exceeds the predetermined value C1 at the timing of every predetermined time T, the count value of the frequent abnormality counter is incremented repeatedly as shown by FIG. 8(d).

Then, at time t2, when the count value of the frequent abnormality counter is equal to the predetermined value C2 the abnormality judgment flag and the forced outage flag are both turned on as shown by FIGS. 8(e) and 8(f).

When the forced outage flag is turned on, the continuous reset of the control microcomputer 31 is performed, as shown by FIG. 8(h). Accordingly, the operations of the fuel injection valves 5a to 5d and the ignition plugs 6a to 6d are forcibly stopped. Then, as shown by FIG. 8(a), the engine 1 is promptly stopped.

When the ignition switch 54 is manipulated to the start position and the starter signal STA is detected as on as shown by FIG. 8(g), at time t3, the forced outage flag is turned off.

Then, as shown by FIG. 8(h), the continuous reset of the control microcomputer 31 is stopped, and the operations of the fuel injection valves 5a to 5d and the ignition plugs 6a to 6d are permitted. Accordingly, the engine 1 is restarted as shown by FIG. 8(a) from the time t3.

The preferred embodiment provides the following advantages.

(1) In the preferred embodiment, the operations of the fuel injection valves 5a to 5d and the ignition plugs 6a to 6d are forcibly stopped when the engine rotational speed NE becomes greater than the predetermined speed K while the control apparatus takes steps to correct the malfunction of the ECU 30. This structure can determine the occurrence of the restricted abnormality, in which the ECU 30 is not able to restrict the engine output in an appropriate manner since the rotational speed NE is excessively high although the engine output is restricted by the fail-safe control. The operation of the engine 1 can be forcibly stopped when there is a fear that the reliability of the fail-safe process might be decreased, this is done by forcibly stopping the operations of the fuel injection valves 5a to 5d and the ignition plugs 6a to 6d when an abnormality is detected. This prohibits the control apparatus to take steps to correct the malfunction of the ECU 30 when the reliability of the fail-safe process might be decreased. Therefore, the fail-safe process is executed in a more suitable manner, and the reliability is improved when the control apparatus takes steps to correct the malfunction of the ECU 30.

(2) In the above preferred embodiment, when the acceleration opening degree PA is less than the predetermined opening degree α and the engine rotational speed NE is greater than the predetermined speed K, the engine is driven with a reduced number of cylinders. That is, the operations of two fuel injection valves, including at least the fuel injection valve 5a, are stopped. Further, if the engine rotational speed NE still exceeds the predetermined speed K, the operations of the fuel injection valves 5a to 5d and the ignition plugs 6a to 6d are forcibly stopped only when the injection command indicating to operate the particular fuel injection valve 5a is sent out from the control microcomputer 31. Therefore, the ECU 30 is prevented from erroneously determining that the engine rotational speed NE is excessively high by the restricted abnormality although, in fact, the engine rotational speed NE is great because the vehicle is descending a slope.

(3) In the above embodiment, the predetermined speed K when the shift position of the automatic transmission 52 is in the N range is set to be greater than the predetermined speed K when the shift position of the automatic transmission 52 is in the D range. Accordingly, the predetermined speed K is set in accordance with the difference of the maximum speed NEmax determined in accordance with the shift position of the automatic transmission 52. Therefore, the ECU 30 accurately determines whether the engine rotational speed NE is excessively high in accordance with the shift position of the automatic transmission 52, in other words, the power transmission state of the power transmission system.

(4) In the preferred embodiment, the operations of the fuel injection valves 5a to 5d and the ignition plugs 6a to 6d are forcibly stopped by continuously sending reset signals from the monitoring microcomputer 32 of the ECU 30 to the control microcomputer 31 to keep the control microcomputer 31 to be initialized. Resetting the control microcomputer 31 reliably and promptly stops the operations of the fuel injection valves 5a to 5d and the ignition plugs 6a to 6d even if there is an abnormality in the control microcomputer 31. Further, by continuously sending reset signals, the control microcomputer 31, which is normally restored from the reset state in a very short time (for example 4 ms), is maintained in the reset state. Accordingly, the operations of the fuel injection valves 5a to 5d and the ignition plugs 6a to 6d are forcibly stopped for a long time.

It should be apparent to those skilled in the art that the present invention may be embodied in many other specific forms without departing from the spirit or scope of the invention. Particularly, it should be understood that the invention may be embodied in the following forms.

In the above embodiment, the present invention is applied to an apparatus that adjusts the engine output by driving the engine with the reduced number of cylinders and correcting delay of the ignition timing as the fail-safe process when the control apparatus takes steps to correct the malfunction of the ECU 30. The present invention may also be applied to an apparatus that reduces or increases the amount of injected fuel in addition to driving the engine with the reduced number of cylinders and correcting the delay of the ignition timing. Further, the present invention may be applied to an apparatus that reduces or increases the amount of injected fuel instead of driving the engine with the reduced number of cylinders and correcting the delay of the ignition timing.

In the above embodiment, the operations of the fuel injection valves 5a to 5d and the ignition plugs 6a to 6d are forcibly stopped when all the conditions (c) to (e) are satisfied. However, the condition (c) may be omitted. This structure also permits the ECU 30 to determine that the engine rotational speed NE is excessively high and fuel is injected erroneously.

The condition (d) may be omitted from the conditions (c) to (e), or the conditions (c) and (d) may be omitted. This structure also permits the ECU 30 to judge that the fuel injection valve 5a is operating against the intention of the control microcomputer 31, in other words, there is a possibility that the reliability of the fail-safe process is decreased. Then, this structure forcibly stops the engine 1. Further, the condition (e) may be omitted, or the conditions (c) and (e) may be omitted.

In the preferred embodiment, the condition (e) is set as one of the conditions for forcibly stopping the operations of the fuel injection valves 5a to 5d and the ignition plugs 6a to 6d. The condition (e) may be changed as required as long as it is determined in a suitable manner that the fuel injection valve unintentionally injects fuel.

Instead of the condition (e), a condition (e') may be added. The condition (e') is that none of the fuel injection valves intentionally injects fuel. The condition (e') permits the ECU 30 to determine whether the fuel injection valve is properly controlled, that is, whether there is a possibility that the reliability of the fail-safe process is decreased.

In the preferred embodiment, the predetermined speed K may be variable in accordance with the coolant temperature THW. In the preferred embodiment, the maximum speed NEmax is variable in accordance with the coolant temperature THW. Therefore, the maximum rotational speed that can be achieved by the engine rotational speed NE during the fail-safe process depends on the coolant temperature THW. In contrast, according to the structure where the predetermined speed K is variable in accordance with the coolant temperature THW, it can be accurately determined whether the engine rotational speed NE is excessively high corresponding to the difference of the maximum speed NEmax.

In the preferred embodiment, the predetermined speed range defined by the maximum speed NEmax and the minimum speed NEmin' is set to a different range depending on whether the shift position of the automatic transmission 52 is in the N range or in the D range. Instead of this, or in addition to this, the predetermined speed range may be variable in accordance with, for example, first, second, and third gears of the automatic transmission 52. According to this structure, by setting the predetermined speed K in accordance with the first, second, and third gears of the automatic transmission 52, it can be determined whether the engine rotational speed NE is excessively high in a suitable manner.

The present invention need not be applied to a vehicle to which the automatic transmission 52 is mounted but may be applied to a vehicle to which a manual transmission or a non-stage transmission is mounted. That is, regardless of the transmission mounted to the vehicle, it is determined whether the engine rotational speed NE is excessively high when the control apparatus takes steps to correct the abnormality of the ECU 30 in a suitable manner by setting the predetermined speed range and the predetermined speed K in accordance with the power transmission state of the power transmission system, which extends from the crankshaft to the axle.

As long as it is determined whether the engine rotational speed NE is excessively high in an appropriate manner, the predetermined speed K may be set to a constant value regardless of the power transmission state of the power transmission system.

The operations of the fuel injection valves 5a to 5d and the ignition plugs 6a to 6d need not be forcibly stopped by continuously sending reset signals from the monitoring microcomputer 32 of the ECU 30 to the control microcomputer 31 to keep the control microcomputer 31 to be initialized. That is, the structure may be arbitrarily changed as long as the operations of the fuel injection valves 5a to 5d and the ignition plugs 6a to 6d are reliably stopped even if there is an abnormality in the control microcomputer 31.

The operations of the fuel injection valves 5a to 5d and the ignition plugs 6a to 6d need not be forcibly stopped when the restricted abnormality, in which the engine output cannot be appropriately controlled during the fail-safe process, is detected. That is, the process performed when the restricted abnormality is detected may be arbitrarily changed as long as the reliability of the fail-safe process is prevented from being decreased in a suitable manner.

The present examples and embodiments are to be considered as illustrative and not restrictive and the invention is not to be limited to the details given herein, but may be modified within the scope and equivalence of the appended claims.

What is claimed is:

1. A vehicular control apparatus comprising:
an engine mounted to a vehicle, wherein air is drawn into the engine, wherein the engine rotates at a rotational speed, and wherein the engine includes at least one manipulation member used for control of output of said engine; and
an electronic control unit, which controls the manipulation member in accordance with a driving condition of the engine, wherein, when it is determined that there is an abnormality in the electronic control unit, the amount of air drawn into the engine is fixed to a predetermined value and the amount of manipulation of the manipulation member is restricted, and
wherein, when the rotational speed of the engine becomes greater than a predetermined speed when it is determined that there is the abnormality in the electronic control unit, the electronic control unit determines that there is an abnormality relating to the manipulation of the manipulation member.

2. The vehicular control apparatus according to claim 1, wherein the predetermined speed is set based on a power transmission state of a power transmission system, which is located between a crankshaft of the engine and an axle of the vehicle.

3. The vehicular control apparatus according to claim 2, wherein the power transmission system selectively transmits power or prevents transmission of power, and wherein the predetermined speed is set to a different speed when the power transmission system transmits power than when the power transmission system prevents transmission of power.

4. The vehicular control unit according to claim 1, wherein the operation of the engine is forcibly stopped when the electronic control unit determines that there is an abnormality relating to the manipulation of the manipulation member.

5. The vehicular control apparatus according to claim 4, wherein the electronic control unit includes a microcomputer, and wherein, when the engine is forcibly stopped, reset signals are continuously sent to the microcomputer.

6. The vehicular control apparatus according to claim 1, wherein, when the engine has a coolant, the predetermined speed is set based on the temperature of the coolant of the engine.

7. A vehicular control apparatus comprising:
an engine mounted to a vehicle, wherein air is drawn into the engine, wherein the engine rotates at a rotational speed, and wherein the engine includes at least one manipulation member used for control of output of said engine; and
an electronic control unit, which controls the manipulation member in accordance with a driving condition of the engine, wherein, when it is determined that there is an abnormality in the electronic control unit, the amount of air drawn into the engine is fixed to a predetermined value and the amount of manipulation of the manipulation member is restricted, and
wherein, when the rotational speed of the engine becomes greater than a predetermined speed when it is determined that there is the abnormality in the electronic control unit, the electronic control unit determines that there is an abnormality relating to the manipulation of the manipulation member,
wherein the predetermined speed is set based on a power transmission state of a power transmission system, which is located between a crankshaft of the engine and an axle of the vehicle,
wherein the engine has more than one cylinder, and wherein the manipulation member is a fuel injection valve provided corresponding to each cylinder,
wherein the electronic control unit restricts at least one of the fuel injection valves from being driven, to restrict the amount of manipulation of the manipulation members, and
wherein the electronic control unit monitors the presence or absence of an injection command to the at least one of the fuel injection valves that are restricted from being driven.

8. A vehicular control apparatus comprising:
an engine mounted to a vehicle, wherein air is drawn into the engine, and wherein the engine includes at least one manipulation member used for control of output of said engine; and
an electronic control unit, which controls the manipulation member in accordance with a driving condition of the engine, wherein, when it is determined that there is an abnormality in the electronic control unit, the amount of air drawn into the engine is fixed to a predetermined value and the amount of manipulation of the manipulation member is restricted, and
a monitoring apparatus, which monitors the actual amount of manipulation of the manipulation member when it is determined that there is the abnormality in the electronic control unit,
wherein, when the actual amount of manipulation of the manipulation member obtained by the monitoring apparatus does not coincide with the amount of manipulation of the manipulation member commanded by the electronic control unit, the electronic control unit determines that there is an abnormality relating to the manipulation of the manipulation member,
wherein the engine has more than one cylinder, and wherein the manipulation member is a fuel injection valve provided corresponding to each cylinder,
wherein the electronic control unit restricts at least one of the fuel injection valves from being driven, to restrict the amount of manipulation of the manipulation members, and
wherein the electronic control unit monitors the presence or absence of an injection command to the at least one of the fuel injection valves that are restricted from being driven.

9. The vehicular control unit according to claim 8, wherein the operation of the engine is forcibly stopped when the electronic control unit determines that there is an abnormality relating to the manipulation of the manipulation member.

10. The vehicular control unit according to claim 9, wherein the electronic control unit includes a microcomputer, and wherein, when the engine is forcibly stopped, reset signals are continuously sent to the microcomputer.

11. A vehicular control apparatus comprising:
an engine mounted to a vehicle, wherein air is drawn into the engine, wherein the engine rotates at a rotational speed, and wherein the engine includes at least one manipulation member used for control of output of said engine; and an electronic control unit, which controls the manipulation member in accordance with a driving condition of the engine, wherein, when it is determined that there is an abnormality in the electronic control unit, the amount of air drawn into the engine is fixed to a predetermined value and the amount of manipulation of the manipulation member is restricted, and a monitoring apparatus, which monitors the actual amount of manipulation of the manipulation member when it is determined that there is the abnormality in the electronic control unit, wherein, when both the actual amount of manipulation of the manipulation member obtained by the monitoring apparatus does not coincide with the amount of manipulation of the manipulation member commanded by the electronic control unit and the rotational speed of the engine is greater than a predetermined speed, the electronic control unit determines that there is an abnormality relating to the manipulation of the manipulation member.

12. The vehicular control apparatus according to claim 11, wherein the predetermined speed is set based on a power transmission state of a power transmission system, which is located between a crankshaft of the engine and an axle of the vehicle.

13. The vehicular control apparatus according to claim 12, wherein the power transmission system selectively transmits power or prevents transmission of power, and wherein the predetermined speed is set to a different speed when the power transmission system transmits power than when the power transmission system prevents transmission of power.

14. The vehicular control unit according to claim 11, wherein the operation of the engine is forcibly stopped when the electronic control unit determines that there is an abnormality relating to the manipulation of the manipulation member.

15. The vehicular control apparatus according to claim 14, wherein the electronic control unit includes a microcomputer, and wherein, when the engine is forcibly stopped, reset signals are continuously sent to the microcomputer.

16. A vehicular control apparatus comprising:

an engine mounted to a vehicle, wherein air is drawn into the engine, wherein the engine rotates at a rotational speed, and wherein the engine includes at least one manipulation member used for control of output of said engine; and an electronic control unit, which controls the manipulation member in accordance with a driving condition of the engine, wherein, when it is determined that there is an abnormality in the electronic control unit, the amount of air drawn into the engine is fixed to a predetermined value and the amount of manipulation of the manipulation member is restricted, and a monitoring apparatus, which monitors the actual amount of manipulation of the manipulation member when it is determined that there is the abnormality in the electronic control unit, wherein, when both the actual amount of manipulation of the manipulation member obtained by the monitoring apparatus does not coincide with the amount of manipulation of the manipulation member commanded by the electronic control unit and the rotational speed of the engine is greater than a predetermined speed, the electronic control unit determines that there is an abnormality relating to the manipulation of the manipulation member, wherein the predetermined speed is set based on a power transmission state of a power transmission system, which is located between a crankshaft of the engine and an axle of the vehicle, wherein the engine has more than one cylinder, and wherein the manipulation member is a fuel injection valve provided corresponding to each cylinder, wherein the electronic control unit restricts at least one of the fuel injection valves from being driven, to restrict the amount of manipulation of the manipulation members, and wherein the electronic control unit monitors the presence or absence of an injection command to the at least one of the fuel injection valves that are restricted from being driven.

* * * * *

UNITED STATES PATENT AND TRADEMARK OFFICE
CERTIFICATE OF CORRECTION

PATENT NO. : 7,096,112 B2  Page 1 of 1
APPLICATION NO. : 10/436274
DATED : August 22, 2006
INVENTOR(S) : Yasuhiro Tanaka et al.

It is certified that error appears in the above-identified patent and that said Letters Patent is hereby corrected as shown below:

In the Title Page, col. 2, under "OTHER PUBLICATIONS: Change the date of the Office Action, Application No. 2002-138754 from "Oct. 16, 2005" to --Oct. 18, 2005--.

| Column | Line | |
|---|---|---|
| 16 | 21 | Change "NEmin'" to --NEmin--. |

Signed and Sealed this

Twenty-sixth Day of December, 2006

JON W. DUDAS
*Director of the United States Patent and Trademark Office*